(12) United States Patent
Funderburg

(10) Patent No.: US 9,717,235 B2
(45) Date of Patent: Aug. 1, 2017

(54) EZ-DEKES

(71) Applicant: Steven Hiser Funderburg, Jackson, MS (US)

(72) Inventor: Steven Hiser Funderburg, Jackson, MS (US)

( * ) Notice: Subject to any disclaimer, the term of this patent is extended or adjusted under 35 U.S.C. 154(b) by 177 days.

(21) Appl. No.: 14/162,739

(22) Filed: Jan. 24, 2014

(65) Prior Publication Data

US 2015/0208639 A1     Jul. 30, 2015

(51) Int. Cl.
*A01M 31/06*     (2006.01)

(52) U.S. Cl.
CPC .................................. *A01M 31/06* (2013.01)

(58) Field of Classification Search
CPC ....... A01M 31/06; A63H 23/04; A63H 23/10; A63H 23/02; A63H 23/06; A63H 23/08; A63H 23/00; A63H 23/005; A63H 3/26; A63B 67/007
See application file for complete search history.

(56) References Cited

U.S. PATENT DOCUMENTS

| | | | | |
|---|---|---|---|---|
| 243,954 A * | 7/1881 | North | ............... | A01M 31/06 43/3 |
| 477,084 A * | 6/1892 | Thorn | ............... | A01M 31/06 43/3 |
| 1,486,329 A * | 3/1924 | George | ............... | A01M 31/06 43/3 |
| 1,527,711 A * | 2/1925 | Stallman | ............... | A01M 31/06 43/3 |
| 1,923,442 A * | 8/1933 | Kilgore | ............... | A01M 31/06 43/3 |
| 2,536,736 A * | 1/1951 | Gazalski | ............... | A01M 31/06 43/3 |
| 3,292,303 A * | 12/1966 | Fors | ............... | A63H 23/02 446/161 |
| 3,408,763 A * | 11/1968 | Rudolph | ............... | A01M 31/06 43/3 |
| 3,939,591 A * | 2/1976 | Schwartztrauber | ... | A01M 31/06 43/3 |
| 4,056,890 A * | 11/1977 | Dembski | ............... | A01M 31/06 43/3 |
| 5,515,637 A * | 5/1996 | Johnson | ............... | A01M 31/06 43/2 |
| 5,832,649 A * | 11/1998 | Kilgore | ............... | A01M 31/06 43/2 |
| 6,698,132 B1 * | 3/2004 | Brint | ............... | A01M 31/06 43/2 |
| 2007/0266614 A1 * | 11/2007 | Cagle | ............... | A01M 31/06 43/3 |

* cited by examiner

*Primary Examiner* — Kathleen Alker
(74) *Attorney, Agent, or Firm* — William J. Dukes

(57) ABSTRACT

An integrated duck decoy, anchor, and retrieval system. Decoy line passes through a vertical cavity in the decoy body, with an anchor attached to the end of decoy line emerging from the bottom of the decoy. The end of decoy line emerging from the top of the decoy terminates in a loop attached to a stopper, which prevents the loop from entering the decoy body. The decoy may be removed from the water by means of the loop. When the decoy line is pulled from the loop end, the anchor will become recessed into the bottom of the decoy body, facilitating easy storage and avoiding tangled anchors and lines.

8 Claims, 7 Drawing Sheets

EZ-DEKES

BACKGROUND OF THE INVENTION

1. Field of the Invention

This invention relates to the field of waterfowl decoys, namely decoys formed into a semblance of a duck and designed to attract wild ducks for hunting or other outdoor recreation.

2. Description of the Related Art

Duck decoys, whether manufactured from hollow bodied plastic, cork, wood, stuffed canvas, or other materials, are routinely used by sportsmen to attract waterfowl, particularly to facilitate hunting, shooting, and photographing waterfowl. Typical configurations include a decoy body with either a permanent or removable head, decoy line attached to the keel or eyelets at the front or rear of the decoy body, and a decoy anchor or weight used to tether the decoy in place where it is deployed.

Some configurations include push-button or spring-activated "slides" used to hold the decoy anchor in place after it is pulled with decoy line to a position adjacent to the bottom or keel of the decoy body. Other configurations require winding or twisting the decoy line around the keel of the decoy body and tucking the anchor weight under the line or wrapping a flat strap lead weight around the decoy body neck/head. Still other configurations incorporate elastic cords or links to the decoy line near the anchor weight to assist in storing the anchor weight once the line is wrapped for storage.

Regardless of configuration, current retrieval of deployed decoys requires the individual to remove the decoy from the water directly and either pull or wrap the decoy line and decoy anchor weight around the decoy body or adjacent to the decoy body. These actions necessarily require some contact with water that can be extremely cold during the North American wildlife hunting seasons.

Accordingly, it is an object of the present invention to provide a duck decoy with an anchor that allows convenient storage of the anchor when the decoy is not in use. Another object of the present invention is to provide a duck decoy that is easy to deploy and retrieve.

BRIEF SUMMARY OF THE INVENTION

These objects are achieved in the present invention by incorporating a hollow cavity within the decoy body, preferably in the form of a vertical cylinder inserted slightly forward of the decoy's midline such that one opening of the cylinder is at the top of the decoy body and another opening of the cylinder is at the bottom of the decoy body.

This hollow cavity within the decoy body facilitates the placement of decoy line or string through the center of the decoy body. The end of the decoy line that emerges from the top of the decoy would be attached to a stopper, shaped so that when the decoy line is pulled from the bottom, the stopper will enter the top opening of the cavity, but not be able to pass fully into the cavity. The decoy line would be formed into a loop emerging from the top of the stopper to allow for retrieval of the decoy by grasping the loop with a finger or through the use of any hook, pole, catch-pole, or other mechanism.

Attached to the opposite end of the decoy line from the loop and stopper would be the decoy anchor. The decoy line could be made available in multiple lengths to facilitate various water depths or could be custom cut for the proper depth of any application. Regardless of length, at the end of the decoy line extending from the bottom of the decoy body would be a molded decoy anchor weight. In one configuration, the decoy anchor would be a flat disc, at the center of which would be a projection to which the decoy line would be attached. By pulling the decoy line from the top, the anchor would be pulled nearly flush to the bottom of the decoy and the projection would enter the bottom opening of the hollow cavity. The projection and cavity could be shaped so that the anchor would become fixed by means of tension or friction, much like a cork in a bottle.

This innovation of passing the decoy line through the decoy body and having the decoy anchor enter a cavity within the decoy body would help prevent anchors and decoy lines from becoming tangled with those of other decoys. Further, the retrieval of the deployed decoys by means of the loop emerging from the top of the floating decoys would allow the sportsman to pull multiple decoys through the retrieval process. By pulling the loop end of the decoy line, the anchor weight would be pulled into and "stoppered" into the bottom of each decoy. Thereafter the sportsman could pull multiple decoys to dry land where the decoys can be placed in storage bags or hung by means of the loops onto hooks, carabiner clips, or other devices. This retrieval mechanism helps the individual retrieiving decoys to avoid becoming wet, needing to remove gloves, or needing to drag a decoy sack or bag into the water for placement of each decoy after retrieval.

In addition to these advantages of the present invention, the vertical arrangement of the cavity within the decoy body ensures that the decoy anchor will fall to the appropriate depth and the decoy will float in an upright manner. Thus, by using this system, decoys can be thrown greater distances without concern that they will land sideways, upside down, or other than upright floating in the water.

DETAILED DESCRIPTION OF THE INVENTION

Figure 3:
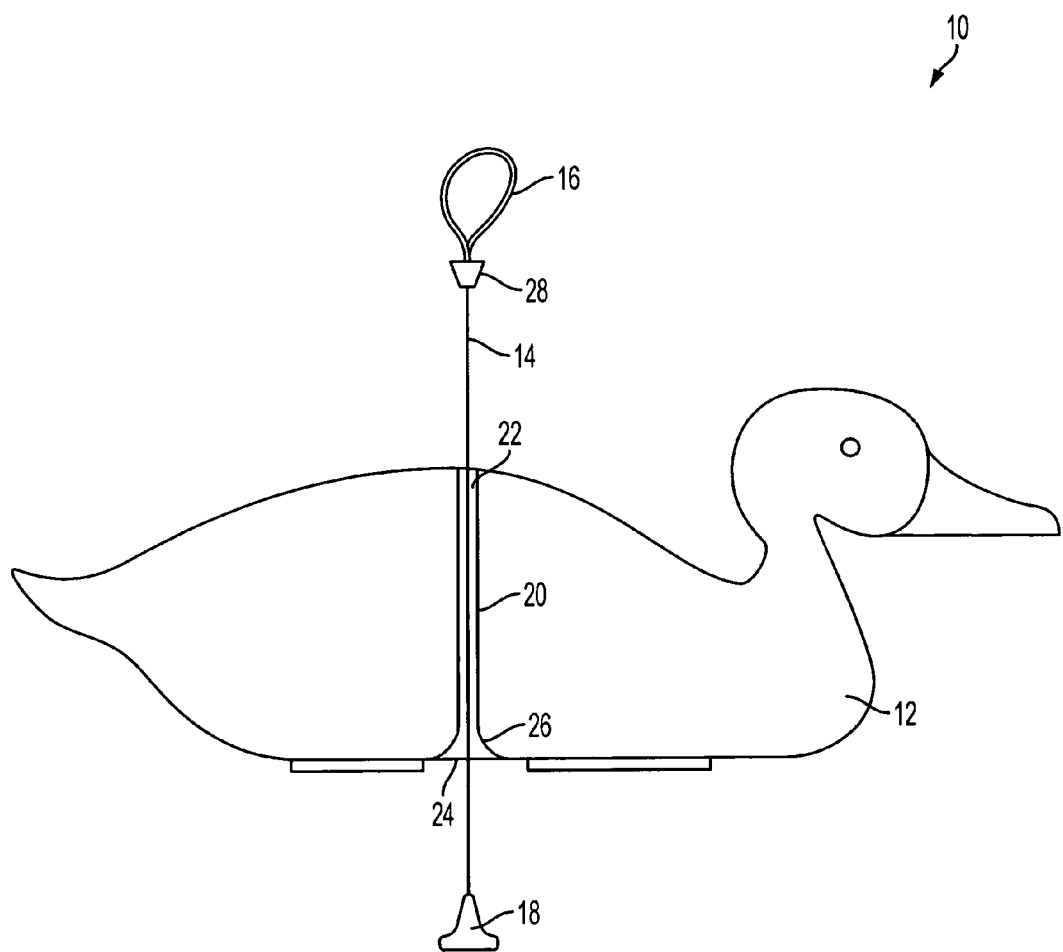
FIG. 3 is a side sectional view of the present invention with the anchor deployed.

With reference to FIG. 3, the decoy system 10 includes a decoy body 12, a decoy line 14, a loop 16 or other retrieval means attached to one end of the decoy line 14, and an anchor 18 attached to the opposite end of the decoy line 14. While the preferred embodiment uses a loop 16 of decoy line 14 approximately 10 cm (4 in.) in diameter for retrieval, those skilled in the art will recognize that loops of various sizes may be used, in addition to a wide variety of other retrieval means, including hooks, loops, and handles made of plastic, metal, wood, or other materials. In one configuration, the decoy line 16 could be inserted into the anchor 18 through a drilled opening or tube and attached by a knot or crimp.

Figure 1:
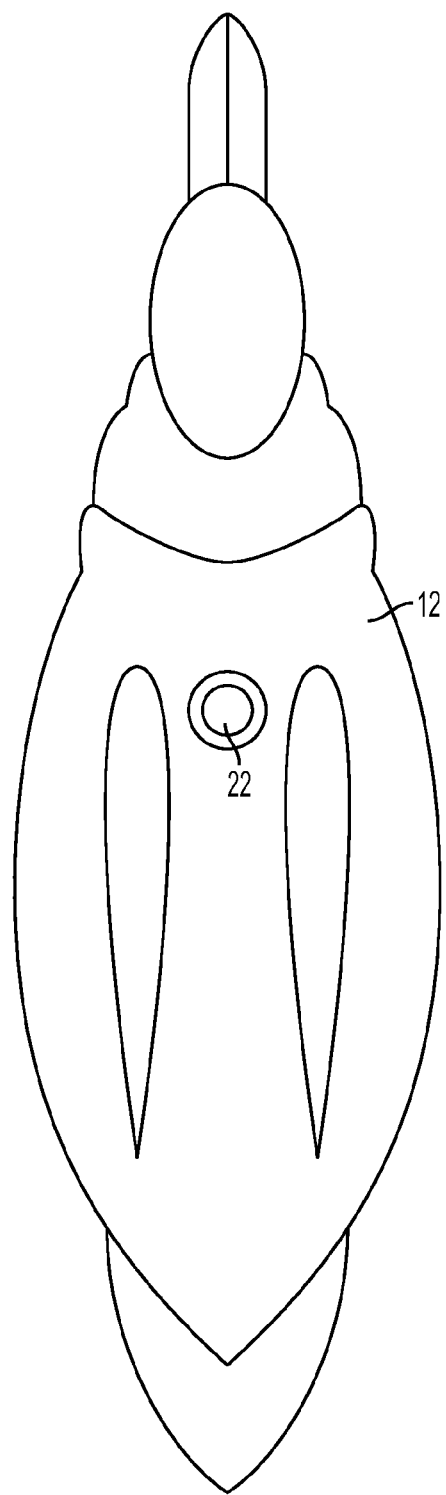
FIG. 1 is a top plan view of the present invention.
Figure 2:
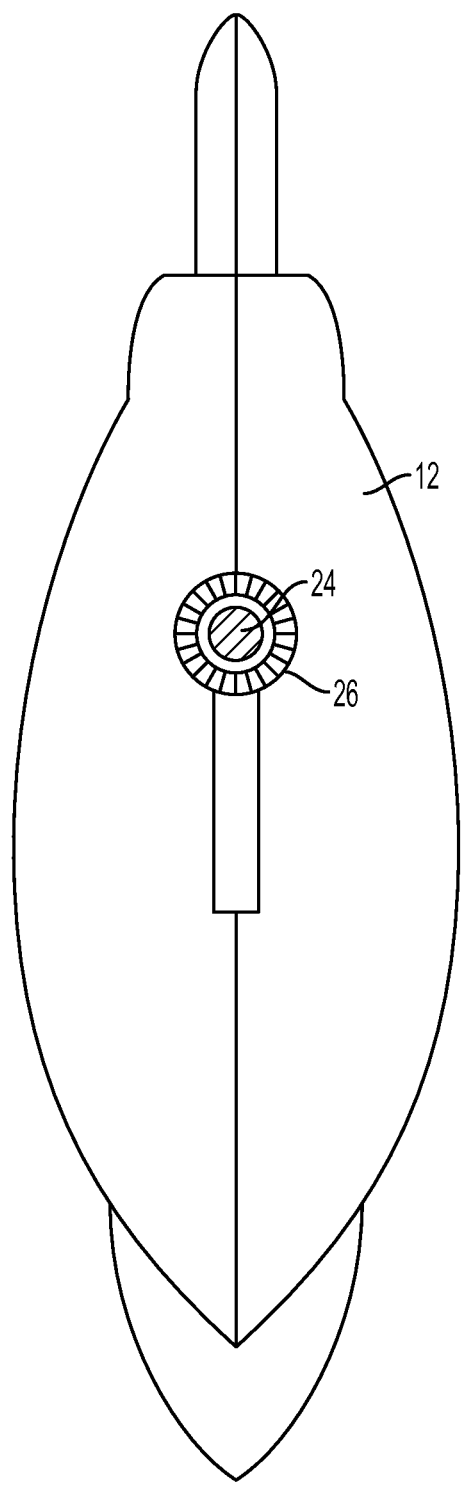
FIG. 2 is a bottom plan view of the present invention.

The decoy body 12 encloses a hollow cavity 20 such that the decoy line 14 passes through the cavity 20. The cavity 20 extends between a first opening 22 in the decoy body 12 and a second opening 24 in the decoy body 12. In the preferred embodiment the first opening 22 is located on the top of the decoy body 12 and the second opening 24 is located on the bottom of the decoy body 12 substantially opposite the first opening 22 such that the hollow cavity 20 forms a substantially vertical column. FIGS. 1 and 2 further illustrate the first opening 22 on the top of the decoy body 12 and the second opening 24 on the bottom of the decoy body 12. Also, in the preferred embodiment, the hollow cavity 20 is located slightly forward of the midline within the decoy body 12. Finally, in this embodiment, the hollow cavity 20 could include a recess 26 tapering from the second opening 24.

In case of a plastic decoy body 12, the hollow cavity 20 would be molded or affixed to the interior of the decoy body 12 such that the decoy body 12 would remain water tight and maintain its floatation ability. While such a hollow cavity 20 could certainly be incorporated within a decoy body 12 made of cork, wood, or stuffed canvas, it would be necessary to seal the insertion points in order to ensure that water would not enter into the decoy body 12 and affect floatation.

Figure 4:
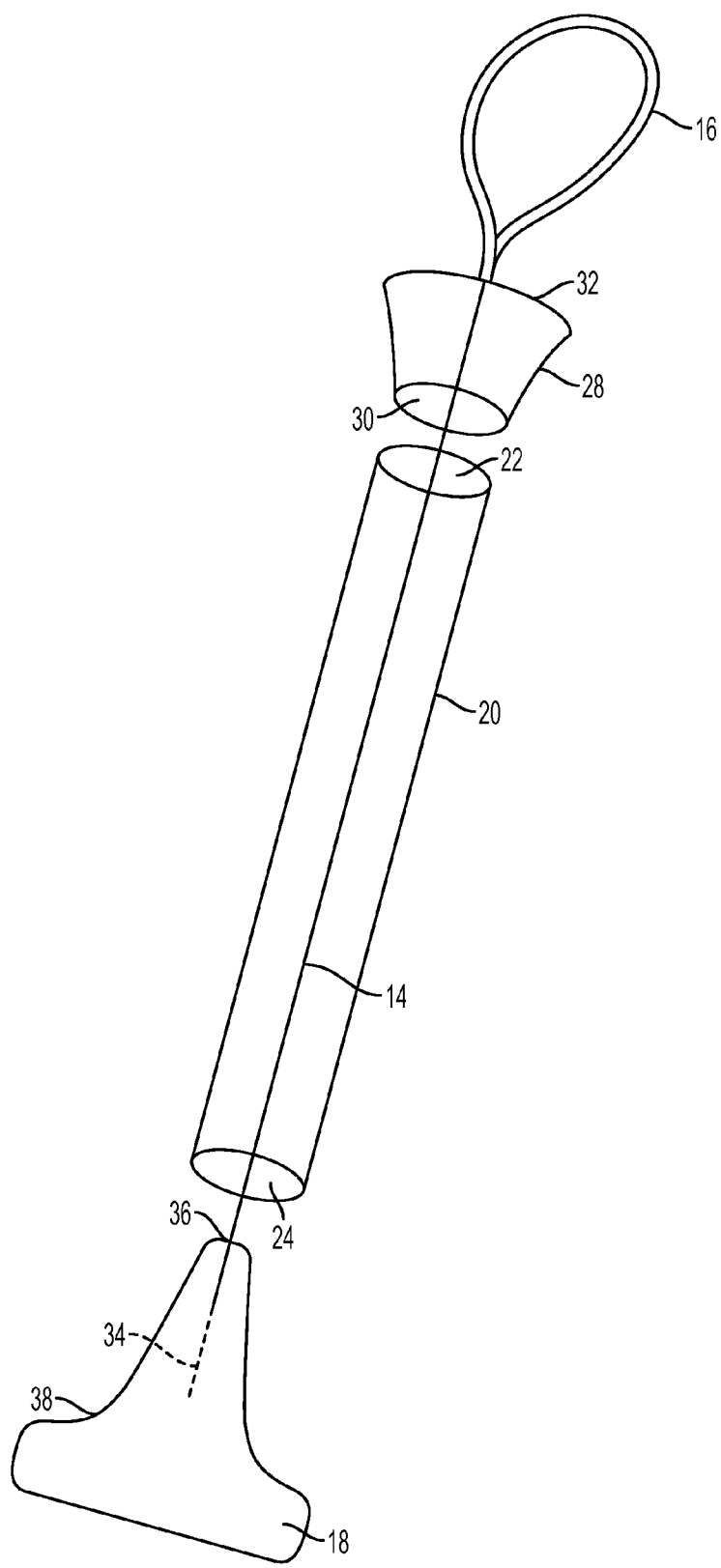
FIG. 4 is an exploded view of the cavity, decoy line, stopper, loop, and anchor of the present invention.

To prevent the loop 16 from passing through the first opening 22 and entering the hollow cavity 20 a stopper 28 or other means, is attached to the decoy line 14 between the loop 16 and the first opening 22. The stopper 28 could be made of plastic, wood, cork, rubber, or other material. With reference to FIG. 4, the stopper 28 may have a concave shape with a proximal end 30 that is smaller than the first opening 22 and a distal end 32 that is larger than the first opening 22. With this concave shape, the stopper 28 is able to become fixed through tension or friction, much like a cork in a bottle, within the first opening 22. In one embodiment, the decoy line 14 would pass through the stopper 28 and be molded or tied into a loop 16 protruding from the stopper 28. In another embodiment, the stopper 28 could have a hole or ring at its top to which a loop 16 or other retrieval means could be attached.

Figure 5:
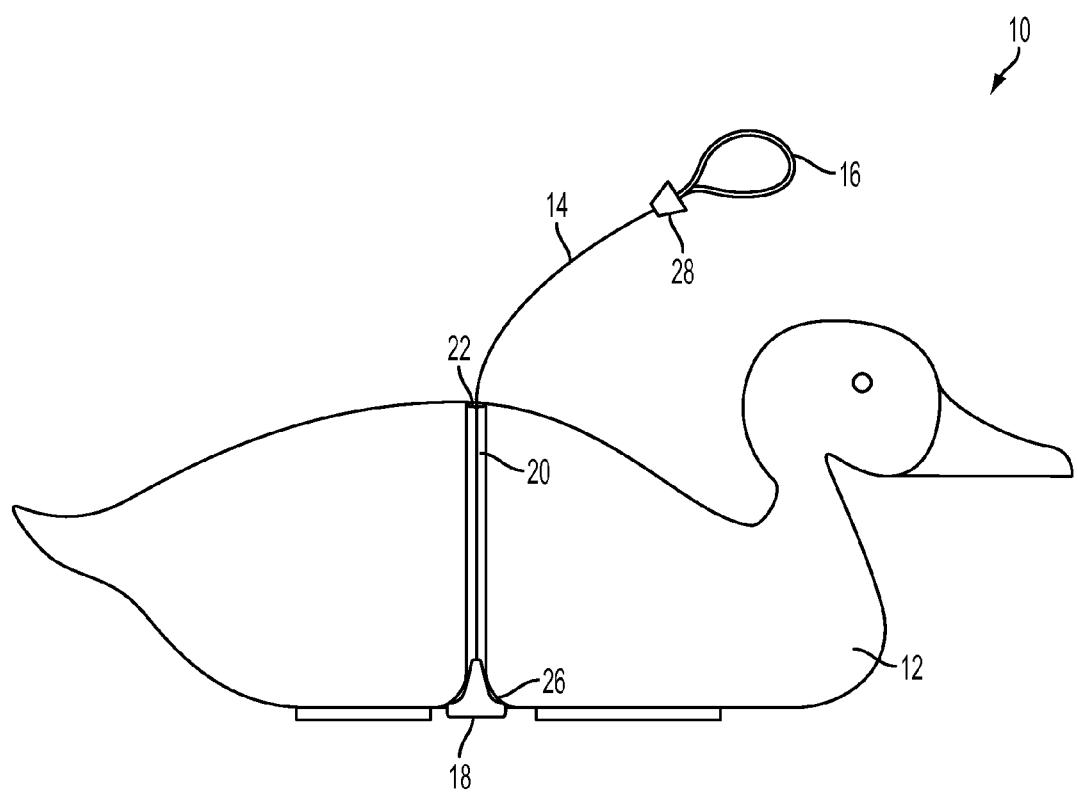
FIG. 5 is a side sectional view of the present invention with the anchor recessed.

Similarly, to prevent the anchor 18 from passing the second opening 24 and entering the hollow cavity 20 a second stopper means should be employed. In one embodiment, with reference to FIG. 4, the anchor 18 would be a flat disc of approximately 2.5 cm (1 in.) to 5 cm (2 in.) diameter and a thickness of approximately 0.65 cm (¼ in.) to 1.3 cm (½ in.), although other dimensions are possible. A projection 34 would extend from the center of the anchor 18 and attach to the decoy line 14. Such a projection would have a concave shape such that the proximal end 36 of the projection 34 would be smaller than the second opening 24 while the distal end, or base 38 of the projection 34 would be larger than the second opening 24. In this embodiment, a sportsman pulling the decoy line 14 by means of the loop 16 could pull the anchor 18 into a position nearly flush with the bottom of the decoy body 12 such that the projection 34 would extend into the second opening 24, as shown in FIG. 5.

In one configuration, the decoy line 14 could be integrated into the anchor 18 through a drilled opening or tube and affixed by a knot or crimp. Likewise, the stopper 28 could be drilled in such a fashion to allow the decoy line 14 to pass through the center of the stopper 28 before being affixed into a loop 16 by means of a crimp or knot. Such a system would allow the sportsman to adjust the effective length of decoy line 14 needed for a particular water depth or hunting situation.

In one embodiment, the hollow cavity 20 could include a recess 26 that tapers from the second opening 24 and matches the contours of the projection 34 such that such that the anchor 18 would lie nearly flush against the bottom of the decoy body 12 when pulled into its recessed position, and the anchor 18 would be held in place through tension or friction, again, much like a cork in a bottle. To facilitate decoy deployment, however, the anchor 18 should not be completely flush, but should preferably protrude from the bottom of the decoy body 12 by approximately 1.3 cm (½ in.) or more, so that the anchor 18 can be easily loosened or removed, from the second opening 24.

In an alternative embodiment, however, the anchor 18 could recess into the decoy body 12 such that it would be completely flush, or nearly so. However, in this embodiment, the shape of the projection 34 and recess 26 should preferably be modified such that the anchor 18 and projection 32 would not become stoppered and fixed due to friction. In this embodiment, the anchor 18 could be held in its recessed position by means of a swivel catch, or similar mechanism.

Figure 7:
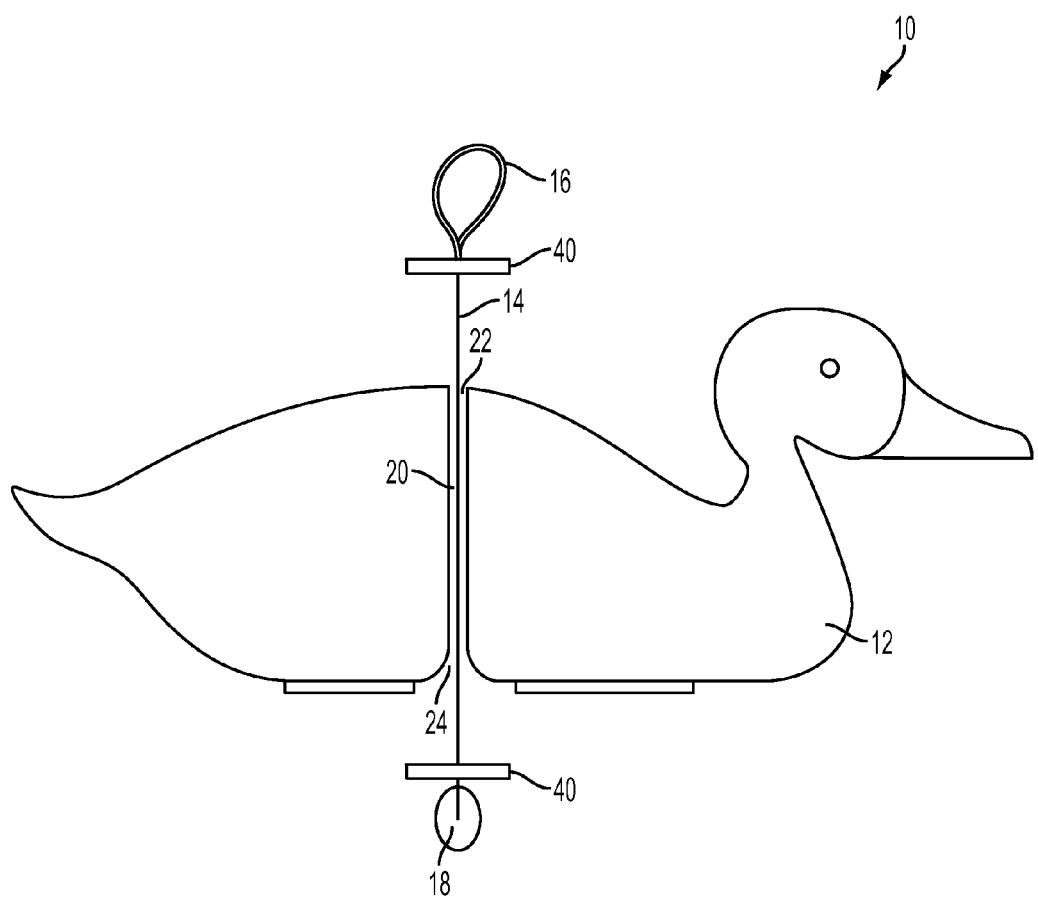
FIG. 7 is a side sectional view of another alternative embodiment of the present invention.

In another alternative embodiment, the tapered stopper 28 could be replaced by a simpler stop mechanism, such as the disc-shaped stop 40 shown in FIG. 7. Such a stop 40 could be made of plastic, rubber, wood, metal, or other material and should have a sufficient size to prevent it from entering the first opening 22. Similarly, a simpler anchor 18 without a tapered projection 34 could be used if a second disc-shaped stop 40 is attached to the decoy line 14 above the anchor 18. Again, this second stop 40 could be made of any of a variety of materials and should have a size sufficient to prevent it from entering the second opening 24. Or in yet another embodiment, the second stop 40 could be omitted if the size of the anchor 18 is sufficiently large to prevent the anchor 18 from passing the second opening 24 and entering the hollow cavity 20. In this last embodiment, the anchor 18 would itself function as the second stop means.

The decoy system 10 of this invention could be manufactured as a complete system, integrating the decoy body 12, decoy line 14, loop 16 or other retrieval means, anchor 18, and stopper 28 or other stop means, as described in the above. In an alternative embodiment, however, the invention could be sold as a "kit" for modification of existing decoys. Such a "kit" could include decoy line 14 of one or more lengths; a stopper 28 or other stop 40 with a loop 16 or other retrieval means attached to the stopper 28 or stop 40; and an anchor 18, possibly attached to a second stop 40.

A sportsman using such a "kit" with a solid decoy body 12 would drill a vertical, hollow cavity 20 through the decoy body 12. He would then pass the decoy line 14 through the cavity 20; attach the upper end of the decoy line 14 to the stopper 28 or stop 40; and attach the lower end of the decoy line 14 to the anchor 18 or second stop 40. The anchor 18, stopper 28, and stop(s) 40, as appropriate, would include an eyelet or other mechanism for attachment to the decoy line 14.

Figure 6:
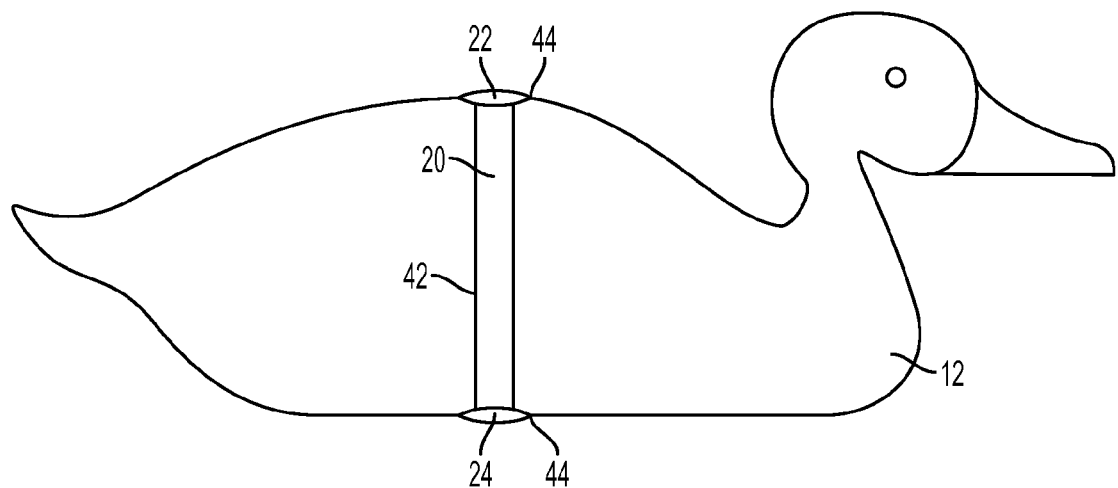
FIG. 6 is a side sectional view of an alternative embodiment of the present invention.

A sportsman using such a "kit" with a hollow decoy body 12 would drill a first opening 22 into the top of the decoy body 12 and a second opening 24 into the bottom of the decoy body 12. A hollow cylinder 42 would then be inserted into the decoy body 12 between the first opening, 22, and the second opening 24, as illustrated in FIG. 6. The cylinder 42 would include flanges 44 made of rubber or other material which would be affixed to the decoy body 12 at the first opening 22 and second opening 24 respectively, by glue, cement, or other adhesive means, to maintain the water tightness and buoyancy of the decoy body 12.

These various embodiments are by no means exhaustive, but should allow those skilled in the art to recognize the wide range of variations and combinations possible within the range of this invention.

The invention claimed is:

1. A decoy, which comprises
 a decoy body having a top, a bottom, a center, a forward end, an aft end opposite the forward end, a decoy head located on the top of the decoy body, a first opening on the top of the decoy body, a second opening on the bottom of the decoy body, and a hollow cavity contained within the decoy body and extending between the first opening and the second opening, such that the distance from the decoy head to the forward end is less than the distance from the decoy head to the aft end, and the distance from the decoy head to the forward end is less than the distance from the first opening to the forward end, and in which the hollow cavity is closer to the center of the decoy body than it is to the forward end of the decoy body;
 a decoy line with a first end and a second end, the decoy line extending through the hollow cavity such that the first end emerges from the first opening and the second end emerges from the second opening;
 a loop made of the same material as the decoy line attached to the first end of the decoy line;
 an anchor attached to the second end of the decoy line;
 a first stop, having a proximal end and a distal end, the proximal end of the first stop being attached to the decoy line between the loop and the anchor and the distal end of the first stop being substantially opposite the proximal end of the first stop; and
 a second stop attached to the decoy line between the first stop and the anchor;
 the decoy line being arranged relative to the hollow cavity such that the first stop is positioned between the first opening and the loop, and the second stop is positioned between the second opening and the anchor.

2. The decoy of claim 1, in which the hollow cavity is a hollow cylinder, open on both ends and having a diameter smaller than the width of the first stop and the width of the second stop, positioned vertically within the decoy body and extending from the first opening to the second opening.

3. The decoy of claim 2, in which the first stop has a concave shape such that the proximal end of the first stop is smaller than the first opening and the distal end of the first stop is larger than the first opening.

4. The decoy of claim 2, in which the second stop is a projection extending from the anchor, said projection having a proximal end and a distal end, where the decoy line is attached to the projection at its proximal end, the distal end of the projection is substantially opposite the proximal end of the projection, and the distal end of the projection is closer to the anchor than the proximal end of the projection, and said projection having a concave shape such that the proximal end of the projection is smaller than the second opening and the distal end of the projection is larger than the second opening.

5. The decoy of claim 4, in which the first stop has a concave shape such that the proximal end of the first stop is smaller than the first opening and the distal end of the first stop is larger than the first opening.

6. The decoy of claim 1, in which the hollow cavity is a substantially vertical column, open on both ends and having a diameter smaller than the width of the first stop and the width of the second stop, and extending from the first opening to the second opening.

7. The decoy of claim 6, in which the first stop has a concave shape such that the proximal end of the first stop is smaller than the first opening and the distal end of the first stop is larger than the first opening.

8. The decoy of claim 6, in which the second stop is a projection extending from the anchor, said projection having a proximal end and a distal end, where the decoy line is attached to the projection at its proximal end, the distal end of the projection is substantially opposite the proximal end of the projection, and the distal end of the projection is closer to the anchor than the proximal end of the projection, and said projection having a concave shape such that the proximal end of the projection is smaller than the second opening and the distal end of the projection is larger than the second opening.

* * * * *